United States Patent Office 3,086,996
Patented Apr. 23, 1963

3,086,996
ETHENYLTETRABORANE AND PROCESS FOR ITS PREPARATION
Isadore Shapiro, Pasadena, and Harold G. Weiss, Duarte, Calif., assignors, by mesne assignments, to Olin Mathieson Chemical Corporation, a corporation of Virginia
No Drawing. Filed June 13, 1956, Ser. No. 591,248
3 Claims. (Cl. 260—606.5)

This invention relates to a new composition of matter, ethenyltetraborane (8), of the empirical formula $B_4C_2H_8$ and methods for its preparation.

The new composition of this invention is ethenyltetraborane (8). It has the empirical formula $B_4C_2H_8$ and in its normal state is a colorless liquid. The melting point of a mixture of the compound with 10% $B_5H_9$ and 2.5% benzene is $-99.2\pm0.5°C$., the calculated boiling point at atmospheric pressure is 56.9° C., and the vapor pressure is represented by the equation log $$p_{mm} = 8.0505 - 1706/T$$

where T is degrees Kelvin. Ethenyltetraborane (8) is useful as a chemical intermediate and also as a high energy fuel for jet engines as described in co-pending application Serial No. 533,944, filed September 13, 1955, of E. A. Weilmuenster and J. A. Zaslowsky.

The ethenyltetraborane of this invention is prepared by reacting pentaborane and acetylene in the molar ratio of 1:1 to 1:10 at a temperature of about 180° to 290° C. and a pressure of 5 to 50 atmospheres. Preferably the reaction temperature is maintained at about 240° to 260° C. and the reaction pressure at about 10 atmospheres. In general, higher temperatures and lower pressures should be avoided to minimize formation of undesirable solids, an indication of the decomposition of pentaborane. Operations at pressures lower than 5 atmospheres should be avoided in order to prevent uncontrollable reactions from taking place which result in the formation of solid organoboranes and which also result in a loss of valuable pentaborane. Prolonged heating with an excess of acetylene enriches the reaction mixture in ethenyltetraborane (8). Reaction periods of 2 to 20 hours can be employed although practical yields are obtained in about 5 hours. The reactor effluent contains in addition to ethenyltetraborane (8), among other compounds, ethylpentaborane, unreacted pentaborane, acetylene and small amounts of benzene.

The separation of ethenyltetraborane (8) from this reactor effluent and the purification of the new composition can be carried out in a series of operations including fractional condensation and selective adsorption. Fractional condensation produces an ethenyltetraborane (8) product contaminated with, among other compounds, ethylpentaborane and benzene. It has been found that the impure ethenyltetraborane (8) resulting from fractional condensation can be further purified by repeated contact at a temperature of 10° to 50° C., preferably at room temperature with a commercial silica-alumina cracking catalyst activated by heating to about 400° C. prior to and between contact with the impure ethenyltetraborane (8). Ethenyltetraborane of extremely high purity of the order of 99.5% can be obtained by repeated treatments in this manner.

Alternatively, ethenyltetraborane (8) after two or more treatments with the activated catalyst can also be further purified by partial hydrolysis with water which results in the conversion of the pentaborane to hydrogen and boric acid. By such a partial hydrolysis treatment a sample of extremely high purity which is suitable as a standard for mass spectral analysis, can be readily obtained.

The invention is more fully described in the examples which follows:

Example I 300 cc. (STP) of gaseous pentaborane-9 and 300 cc. (STP) of acetylene gas were condensed into an evacuated stainless steel tank using liquid nitrogen as a refrigerant. The tank is a conventional high-pressure cylinder (15,000 lb. test) having an internal volume of 100 cc. The tank was placed in an oven at 250° C. After 16 hours' heating, the contents of the tank were transferred to the vacuum rack where the product mixture was fractionated through $-80°$ C. and $-135°$ C. baths. Mass spectral analysis of these fractions showed that the reaction products consisted principally of ethenyltetraborane (8) together with benzene and ethylpentaborane. It was observed that essentially no hydrogen was formed during reaction thus indicating that the pentaborane does not decompose under these conditions.

Example II

About 10 grams of silica-alumina catalyst was placed in a tube and heated to 400° C. in vacuo on the vacuum rack. The catalyst was cooled to liquid nitrogen temperature and approximately 200 cc. of gaseous product containing about 40% ethenyltetraborane (8), the rest being pentaborane, benzene, and ethylpentaborane, was condensed in the tube. On warming to room temperature, the pressure in the system was barely detectable, indicating that the material was adsorbed on the catalyst. However, material could be removed from the catalyst by applying vacuum and pumping the gases through a trap adjoining the catalyst tube, the trap being cooled by a liquid nitrogen bath. After one exposure to the catalyst, the recovered gas was found to contain 87.5% ethenyltetraborane (8). A second exposure increased the purity to 90%, the remaining 10% being pentaborane.

The identification of ethenyltetraborane (8) was accomplished by use of the mass spectrometer. The mass spectrum of the parent group of this compound is as follows:

| Mass number (m./e.): | Relative peak heights |
|---|---|
| 67 | 10.8. |
| 68 | 23.3. |
| 69 | 30.2. |
| 70 | 30.8. |
| 71 | 50.0. |
| 72 | 80.8. |
| 73 | 100.0. |
| 74 | 56.2. |
| 75 | 36.7. |
| 76 | 32.2. |
| 77 | 0.7. *C isotope. |

The technique of substituting $B^{10}$ enriched pentaborane in the preparation of the ethenyltetraborane (8) was used to determine the number of boron atoms in this compound. The method of analysis involves the transformation of the mass spectrum of the $B^{10}$ enriched product into that of a product containing boron of normal isotopic distribution. By this method it was determined that 4 borons are present in the compound. From the isotopically normal spectrum it can be shown that two carbon atoms and eight hydrogen atoms are also present in the compound.

We claim:
1. Ethenyltetraborane (8) having the empirical formula $B_4C_2H_8$.
2. A process for the preparation of ethenyltetraborane (8) having the empirical formula $B_4C_2H_8$ which comprises contacting pentaborane-9 and acetylene in a molar ratio of 1:1 to 1:10 at a temperature of 180° to 290° C. and a pressure of 5 to 50 atmospheres.

3. A process for the separation of ethenyltetraborane (8) of the empirical formula $B_4C_2H_8$ from ethylpentaborane and benzene which comprises contacting the mixture at 10° to 50° C. with a silica-alumina cracking catalyst, activated by heating to about 400° C. prior to contact with the mixture to be separated, and condensing the unadsorbed gas to obtain ethenyltetraborane (8).

References Cited in the file of this patent

Hurd, "Chemistry of the Hydrides," John Wiley & Sons, Inc., New York (1950), page 83.

UNITED STATES PATENT OFFICE
CERTIFICATE OF CORRECTION

Patent No. 3,086,996 April 23, 1963

Isadore Shapiro et al.

It is hereby certified that error appears in the above numbered patent requiring correction and that the said Letters Patent should read as corrected below.

Column 1, line 21, for "$p_{mm}=8.0505-1706/T$" read -- $p_{mm}=8.0503-1706/T$ --.

Signed and sealed this 3rd day of December 1963.

(SEAL)
Attest:

ERNEST W. SWIDER
Attesting Officer

EDWIN L. REYNOLDS

Acting Commissioner of Patents